June 13, 1950   O. BLAVIER   2,510,950
WORK HOLDING ATTACHMENT FOR TOOLS

Filed July 31, 1946   2 Sheets-Sheet 1

INVENTOR.
Otto Blavier
BY   M. O. Hayes
ATTORNEY

June 13, 1950      O. BLAVIER      2,510,950
WORK HOLDING ATTACHMENT FOR TOOLS
Filed July 31, 1946      2 Sheets-Sheet 2
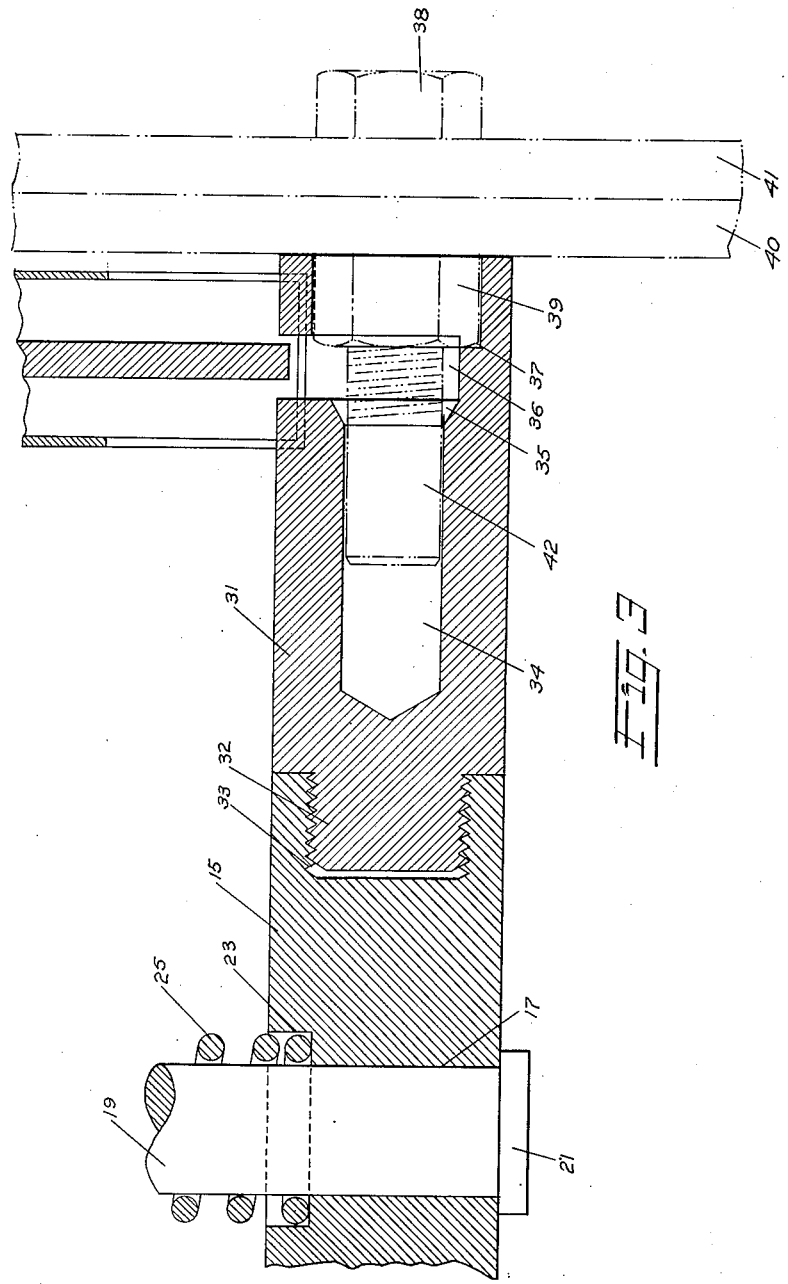
INVENTOR.
Otto Blavier
BY
M. O. Hayes
ATTORNEY Patented June 13, 1950

2,510,950

UNITED STATES PATENT OFFICE 2,510,950

WORK-HOLDING ATTACHMENT FOR TOOLS

Otto Blavier, Warrington, Pa.

Application July 31, 1946, Serial No. 687,501

4 Claims. (Cl. 51—170)

(Granted under the act of March 3, 1883, as
amended April 30, 1928; 370 O. G. 757)

This invention relates to a work-holding attachment for a tool and more specifically to an attachment having a jig, which fits over the nut and the protruding end of the bolt forming the work, to guide the tool such as a grinding wheel while cutting off the end of the bolt flush with the face of the nut.

An object of this invention is to provide an attachment for grinding wheels, which will facilitate cutting off of the protruding portion of the bolt flush with the face of the nut attached thereto.

Another object is to provide an attachment with a guide bar having a detachable jig, which will fit different size nuts and bolts.

Further objects and advantages of this invention, as well as its construction arrangement and operation will be apparent from the following description and claims in connection with the accompanying drawings, in which Fig. 1 is a side elevational view of a preferred embodiment of the invention attached to a grinding wheel.

Fig. 3 is a sectional view taken on line 3—3 of Fig. 2.

Figure 1:
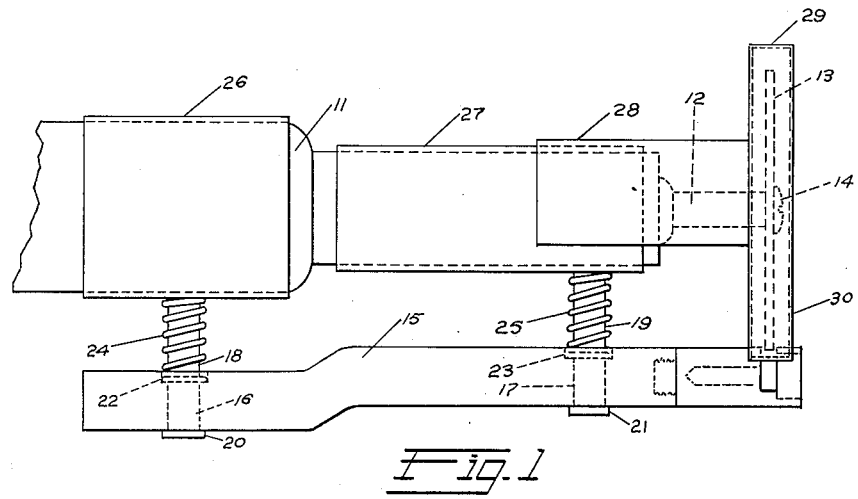

A preferred form of the invention is shown in Fig. 1 wherein the motor 11 has a shaft 12 having a grinding wheel 13 secured thereto by means of a screw 14.

An offset guide bar 15 has bores 16 and 17 through which pass guide rods 18 and 19. Collars 20 and 21 retain the guide bar 15 on the guide rods 16 and 17. Recesses 22 and 23 in the upper portion of the guide bar 15 form seats for the springs 24 and 25, which resiliently urge the guide bar 15 away from sleeves 26 and 27. Sleeves 26 and 27 fit snugly over the housing of the motor 11. Attached to sleeve 27 is a support 28 on which is mounted a guard 29, which encloses a major portion of the grinding wheel 13.

Figure 2:
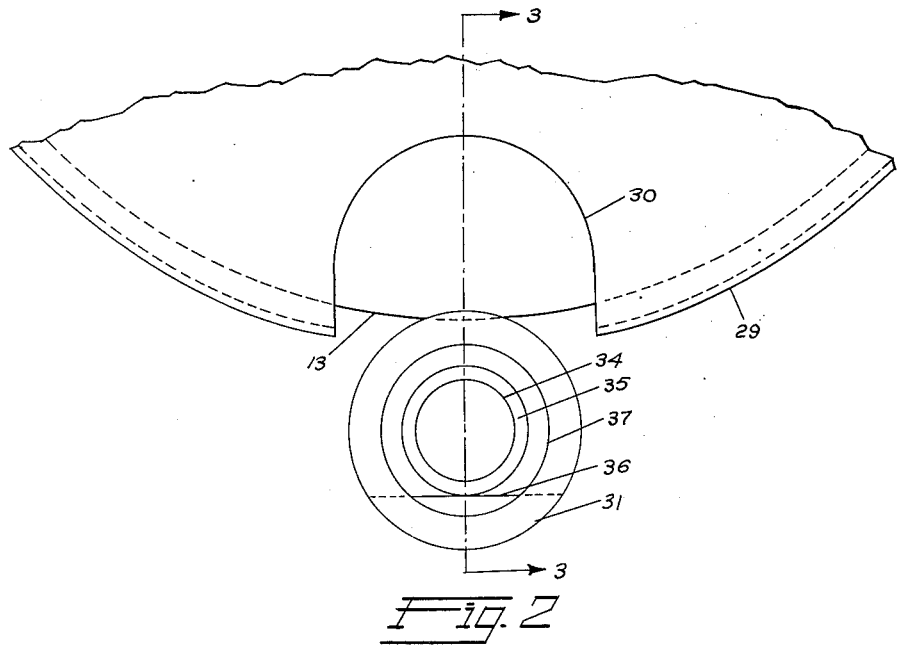
Fig. 2 is an enlarged end elevational view of a portion of the grinding wheel, guard, and detachable jig.

Guard 29 (Fig. 2) has a slot 30 cut out of the bottom portion to permit the jig 31 to move into operative relation with the grinding wheel 13.

In Figure 3, the jig 31 has a threaded extension 32 at one end engaging the threaded bore 33 in the guide bar 15. At the opposite end of jig 31 is a bore 34 joining the short tapered bore section 35, a slot 36 and an enlarged bore portion 37.

A bolt 38 and nut 39 are shown securing together two plates 40 and 41. Nut 39 fits snugly in bore 37 while the threaded extension of the bolt 42 extends into the bore 34.

In the operation of the device, the jig 31 is placed over the nut 39 and the threaded extension of the bolt 42, and when an operator squeezes together the sleeve 27 and guide bar 15, the grinding wheel 13 enters the slot 36 cutting off the threaded extension 42 flush with the face of the nut 39.

A plurality of detachable jigs 31 can be made to fit various different sizes of bolts and nuts, and can be quickly and easily replaced to do any particular job.

It is to be understood that various modifications and changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. In combination a rotary motor having a drive shaft with a grinding wheel attached thereto, a sleeve secured to said motor, a guide bar mounted on said sleeve, means resiliently urging said guide bar away from said sleeve, a jig detachably secured to one end of said guide bar adjacent said grinding wheel, an enlarged bore at the outer end of said jig adapted to receive a nut, a reduced bore connecting with said enlarged bore and adapted to receive the protruding portion of a bolt, a slot extending transversely thru said jig, said slot being aligned with said grinding wheel to permit the cutting off of the bolt flush with the face of the nut.

2. In combination, a frame, means fixedly mounted on said frame for supporting a tool, and a holder for a workpiece comprising a plurality of smooth studs extending from said frame substantially perpendicularly thereto, and an elongated support disposed substantially parallel to said frame and mounted on said studs for sliding movement relative to said frame toward and away from the tool, said support adjacent the tool having an axial bore having varying-diameter portions for receiving a workpiece of which the profile conforms with said varying-diameter portions, the support having a transverse slot opening into said bore to expose the workpiece to the tool.

3. The combination as in claim 2 wherein the axial bore of said support comprises a tapered-wall portion intermediate a small- and largediameter portion, and said slot is next adjacent said tapered wall portion.

4. In combination, a frame, means mounted on said frame for supporting a tool, and a holder for a workpiece comprising a stud extending from said frame substantially perpendicularly thereto, and a support disposed substantially parallel to said frame and mounted on said stud for sliding movement relative to said frame toward and away from the tool, said support adjacent the tool having a bore for receiving a workpiece, the support having an opening into said bore to expose the workpiece to the tool.

OTTO BLAVIER.

REFERENCES CITED

The following references are of record in the file of this patent:

UNITED STATES PATENTS

| Number | Name | Date |
|---|---|---|
| 570,867 | Clark | Nov. 3, 1896 |
| 725,266 | Merritt | Apr. 14, 1903 |
| 1,051,695 | Cramer | Jan. 28, 1913 |
| 1,261,669 | Wright | Apr. 2, 1918 |
| 1,341,818 | Onsrud | June 1, 1920 |
| 2,430,984 | Hopkins | Nov. 18, 1947 |

FOREIGN PATENTS

| Number | Country | Date |
|---|---|---|
| 105,886 | Great Britain | May 3, 1917 |